W. M. AND J. H. JONES.
STUMP PULLER AND PILER.
APPLICATION FILED JULY 11, 1919.
1,341,176.
Patented May 25, 1920.
2 SHEETS—SHEET 1.
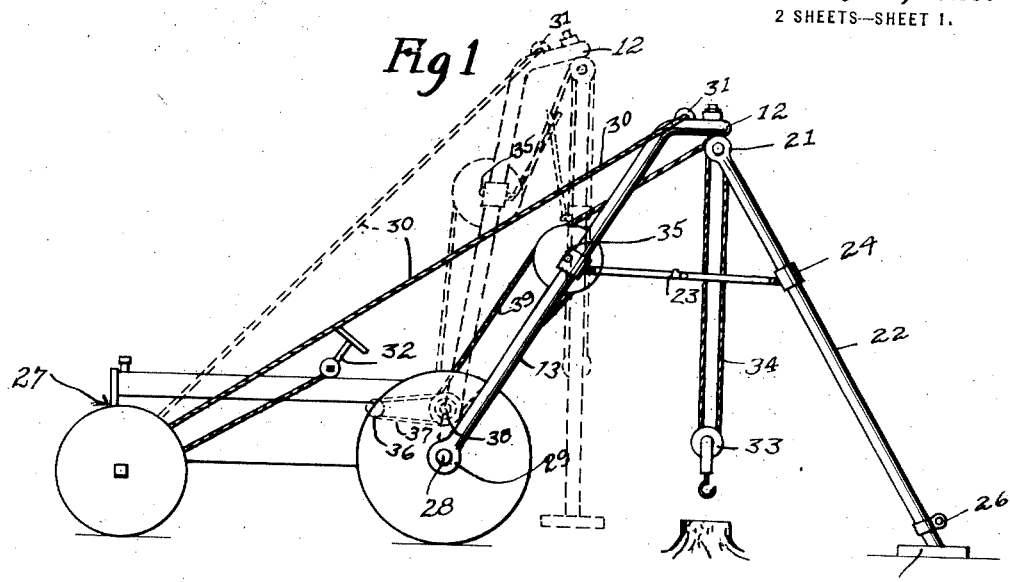
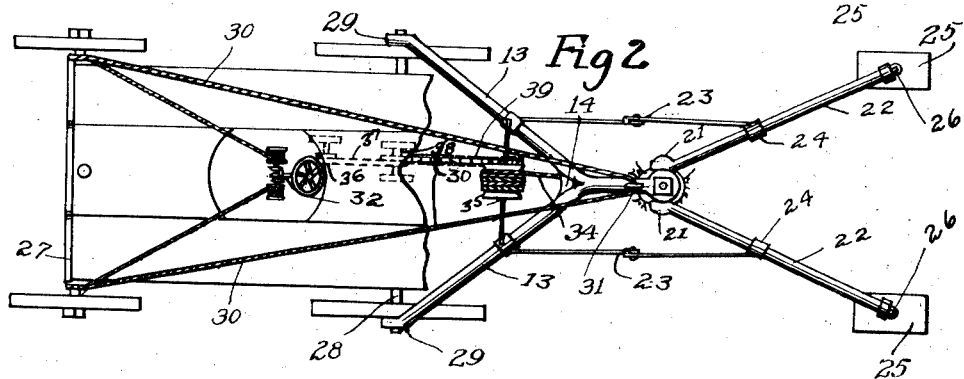
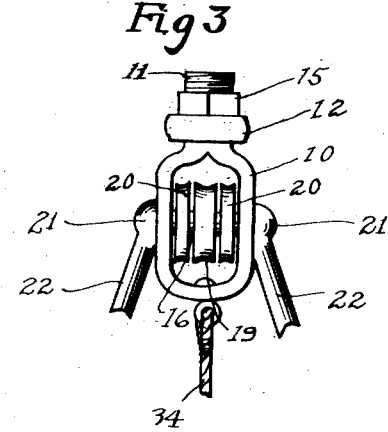
Inventor
William M. Jones
and Jeff H. Jones
By Chandlee & Chandlee
Attorneys

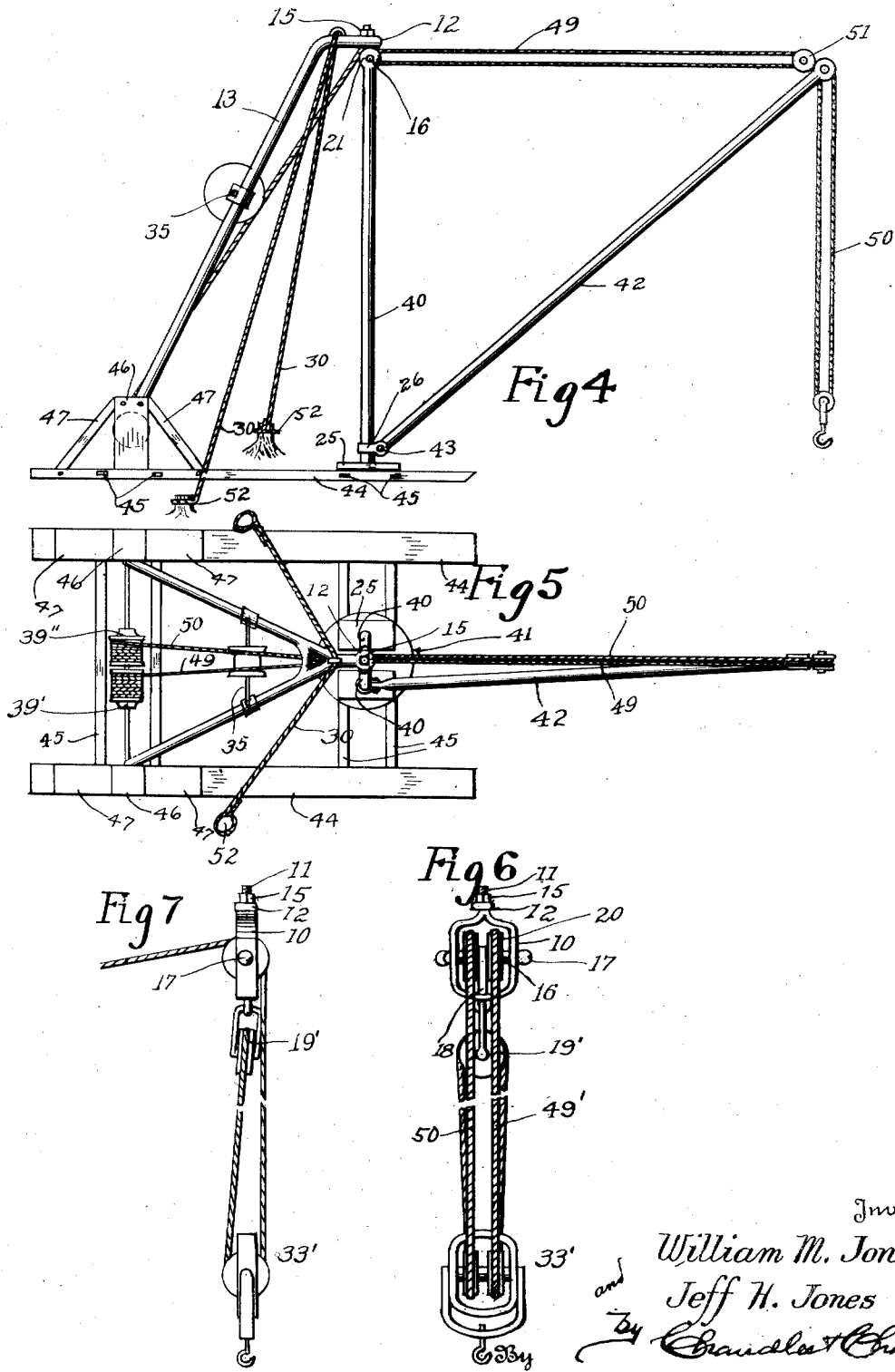

UNITED STATES PATENT OFFICE.

WILLIAM M. JONES AND JEFF H. JONES, OF NEW HOLSTEIN, WISCONSIN, ASSIGNORS OF ONE-THIRD TO SAMUEL H. JONES, OF NEW HOLSTEIN, WISCONSIN.

STUMP PULLER AND PILER.

1,341,176.     Specification of Letters Patent.     Patented May 25, 1920.

Application filed July 11, 1919. Serial No. 310,187.

*To all whom it may concern:*

Be it known that we, WILLIAM M. JONES and JEFF H. JONES, citizens of the United States, residing at New Holstein, in the county of Calumet, State of Wisconsin, have invented certain new and useful Improvements in Stump Pullers and Pilers; and we do hereby declare the following to be a full, clear, and exact description of the invention, such as will enable others skilled in the art to which it appertains to make and use the same.

This invention has special reference to improvements in land clearing machines and more particularly to a combination stump puller and piler.

The primary object of the invention is to provide a stump pulling device which may be applied to a tractor so as to be operated by the tractor and moved about from one stump to another as the stumps are pulled, the fact that the device is attachable to a tractor being of advantage on account of the tractor rapidly replacing the horse, while, in addition, the parts of the puller with slight modification may be mounted upon a skid or other transporting means so that it can be moved about and employed as a piler.

With the above objects and others in view as will appear as the specification proceeds, the invention comprises certain novel combinations and arrangements of parts as will be hereinafter more particularly pointed out and claimed.

Reference is had to the accompanying drawings forming a part of this application, wherein like characters designate corresponding parts throughout the several views in which—

Figure 1 is a side elevation of our improved land clearing machine set up as a stump puller, Fig. 2 is a plan view, Fig. 3 is an enlarged detailed view of a block employed with the device, Fig. 4 is a side elevation of the device set up as a stump piler or derrick, Fig. 5 is a plan view of the device shown in Fig. 4, and Fig. 6 is an elevation of a modified form of the block, and Fig. 7 is an elevation of the same at right angles to Fig. 6.

Referring to the drawings in detail, our improved land clearing machine when set up as a stump puller, embodies a vertically positioned loop or frame 10 preferably of dropped forged steel in one piece and provided with a vertical threaded shank 11 designed to engage the horizontally positioned aperture end 12 of a pair of hinged or pivoted braces 13. That is, the braces 13 are joined as shown at 14 from which the shank portion extends to form the apertured bearing or end 12 which is retained on the shank 11 as by means of a jam-nut 15.

The opposed sides of the block or frame 10 are engaged by a shaft 16 having ball terminals 17 at the ends thereof outwardly of the sides of the block, while rotatable on the shaft are a series of grooved sheaves or pulleys consisting of a large intermediate sheave 19 and outer sheaves 20 preferably of lighter construction, the former being employed for pulling stumps and the latter being used for hoisting in a manner to be hereinafter more particularly pointed out.

Pivoted to the ball terminals 17 for substantially universal movement are enlarged upper ends 21 of a pair of beams 22, said ends 21 being in the form of sockets engaging the ball terminals to produce ball and socket joints permitting the beams to swing toward and away from each other or to swing vertically on a horizontal axis for a purpose which will also be explained. The braces 13 and the beams 22 are preferably connected by jointed braces 23, suitable clamps 24 being fitted on the respective beams and braces to permit connection of the braces 23 therewith pivotally. That is, the sections of the jointed braces connected by knuckle joints between the respective pairs of braces and beams at the opposite sides of the device, are adapted to fold when the joints are broken for a purpose to be hereinafter made apparent or to extend rigidly to brace said parts in spaced relation when the sections of the jointed braces are alined. Mounted on the lower ends of the beams 22 are shoes or the like 25 designed to engage the ground at one side of a stump as illustratd in Fig. 1 of the drawing, while mounted on the beams above said shoes are clamps 26 which like the clamps 24 are made in the form of straps encircling the beams and provided with apertured lugs as shown, except that the lugs of the clamps 26 extend oppositely with respect to the direction of extent of the lugs of the clamps 24. The clamps 26 are for use when the device is set up as a stump piler as will be later described.

The braces 13 are designed to be engaged upon the tractor or motor vehicle indicated at 27, being connected to the rear axle 28 thereof through the medium of the apertured bearings 29 at the lower ends of the braces 13, in position to straddle the tractor whereby the device is supported in conjunction with the shoes so that it may be moved from place to place and arranged over a stump with facility.

However, when the device is being transported, it is adapted to be swung vertically on the axle 28 as a pivot for the braces 13 after the braces 23 are broken upwardly so that the shoes 25 will clear the ground in the manner shown in dotted lines in Fig. 1 of the drawings. This is accomplished by means of a pair of cables 30 which are connected to the enlargement 12 as through the medium of an eye extension 31 provided thereon at the tractor side, said cables being carried over sheaves at the front of the machine and then extended rearwardly and connected to a winding device 32 adapted to be manually operated from the driver's seat of the tractor so as to permit the arrangement to be raised or lowered. The stumps are designed to be pulled through the medium of a block and tackle mechanism 33 and a power cable 34 mounted upon the sheave 19, one lap passing over the sheave and the end of the other lap suitably anchored to the block 10 at the bight portion thereof disposed lowermost. This cable indicated at 34 is wound upon a drum 35 capable of control from the tractor when the motor of the latter is operated independently of the drive wheels thereof, as is common in the art of tractors. The drum shaft is suitably driven from the pulley of the tractor indicated at 36 which through the medium of a sprocket and chain connection 37 serves to operate a counter shaft 38 carrying a second sprocket wheel from which the drum is driven by a chain and sprocket connection 39, such drive connections serving as a reducing gear between the motor and the drum. By this arrangement the device can be attached to almost any make of tractor or motor vehicle with slight modification and adjustments, and, when so attached or coupled, will provide a tremendous lifting power equal to or greater than any of the well known forms, besides possessing convenience of operation and control and production at a minimum cost as a stump puller or the like.

When the device is set up for use as a piler or hoist in the form of a derrick, as shown in Figs. 4 and 5 of the drawings, the beams 22 are brought closer together to produce a mast 40, the shoes 25 resting on a circular plate 41 forming a turntable allowing the mast and thus the boom 42 to swing in an arc through the major part of a circle. The boom 42 is connected to one of the clamps 26 as shown at 43 so as to swing on a horizontal axis whereby the boom may be raised or lowered at its free end. Also, the turntable 41 is rotatably mounted on cross-braces 45 between a pair of spaced parallel skids 44 provided for this purpose, the skids affording a vehicle whereby the entire mechanism may be fixedly supported or can be transported. The braces 13 are pivotally connected to uprights 46 suitably braced on opposite skids as shown at 47, and the uprights are connected by a shaft designed to support a pair of drums 39' and 39'' for cables 49 and 50 which operate over the sheaves 20, the former passing around a pulley 51 at the free end of the boom and back to the mast as shown in Fig. 4 so as to permit the boom to be raised or lowered, and the cable 50 leading over another pulley to the block and tackle mechanism which is employed for piling, hoisting or like purpose. Furthermore, the cables 30 are now used as guy ropes and may be anchored at suitable points to stumps or stakes 52, to retain the device in position and resist lifting strain at the free end of the boom. In adapting the puller to operate as a hoist or piler, the tractor is backed up to the skids and by detaching the parts from the tractor they may be readily attached to the skids, which latter and the boom constitute the only additional elements required for the new work, and it will be clear that the change can be made in a short space of time.

In the form of the invention shown in Fig. 6 of the drawings, the loop or frame 10 and the shaft 16 with the ball terminals 17 are employed as shown in Fig. 3, while mounted on the shaft is a bearing 18 extending through the end or bight portion of the loop and rotatably carrying a small intermediate sheave or pulley 19' positioned between and below the spaced sheaves or pulleys 20 and with its axis at right angles to the shaft 16. This sheave 19' is engaged by the bend at the midlength of a double cable instead of a single cable anchored to the loop 10 as is the cable 24. The sheave or pulley 19' serves as an equalizer to take up any difference in the pull on the two stretches 49' and 50' of this cable. Said stretches lead under sheaves in a double pulley block 33' and thence upward and over the sheaves 20 in the block 10 at the head of the structure, and inward to the drum or other power mechanism.

What is claimed is:—

1. A stump puller comprising a vehicle frame, braces pivoted to the frame, beams pivoted to the braces, shoes at the lower ends of the beams, guy ropes connected to braces, anchoring means therefor, block and tackle mechanism supported by the pivot between the braces and beams, and a winding drum for said block and tackle mechanism.

2. A stump puller comprising a frame, braces pivoted to the frame on a vertical axis, beams pivoted to the frame on horizontal axes, shoes at the lower ends of the beams, guy ropes connected to braces adjacent to the frame, anchoring means therefor, block and tackle mechanism associated with the frame and a winding drum engageable by said block and tackle mechanism.

3. A combined stump puller and piler comprising the combination with a motor vehicle; of braces pivotally mounted on one axle thereof and having an apertured enlargement at their upper ends, a loop having a shank pivotally engaged in said enlargement, a sheave supporting shaft through the loop and having ball terminals, beams having sockets engaged with said terminals for substantial universal movement, shoes at the lower ends of the beams, a block and tackle mechanism hung from said loop and having a cable passing around one of the sheaves, a winding mechanism for the cable, and means for driving it from the motor on said vehicle.

4. A combined stump puller and piler comprising the combination with a tractor, of braces designed to pivotally connect with the drive axle thereof and having an apertured enlargement at their upper ends, a vertical loop having a shank pivotally engaged in said enlargement, a sheave supporting shaft engaged through the loop and having ball terminals, beams having sockets engaged with said terminals for substantial universal movement, means to hold the braces and beams in fixed relation, a block and tackle mechanism having a cable engaged around one of the sheaves, and a winding mechanism engageable by the cable.

5. A combined stump puller and piler comprising the combination with a tractor, of braces designed to pivotally connect with the drive axle thereof and having an apertured enlargement at their upper ends, a vertical loop having a shank pivotally engaged in said enlargement, a sheave supporting shaft engaged through the loop and having ball terminals, beams having sockets engaged with said terminals for substantial universal movement, means to hold the braces and beams in fixed relation, lifting means associated with the braces and beams, and boom supporting clamps carried by the beams.

6. A combined stump puller and piler comprising the combination with a tractor, of braces designed to pivotally connect with the drive axle thereof and having an apertured enlargement at their upper ends, a vertical loop having a shank pivotally engaged in said enlargement, a sheave supporting shaft engaged through the loop and having ball terminals, beams having sockets engaged with said terminals for substantial universal movement, foldable connecting means between the braces and beams, a block and tackle mechanism having a cable operating over one of said sheaves, a winding drum connected on the braces and to which said cable is connected, operative connections between the tractor motor and the drum for driving the latter, said means constituting a reducing gear, and ropes connected to the braces and adapted to be actuated for raising or lowering the device with respect to the tractor.

7. A stump puller and piler comprising a supporting and transporting means, beams mounted in upwardly converging relation, braces mounted in corresponding relation and diverging downwardly with respect to the beams, a connection between the braces and beams permitting relative angular movement thereof, sheaves carried by said connection, boom supporting means carried by the beams, a winding means carried by the supporting means, block and tackle mechanism engageable over said sheaves and associated with the winding mechanism, and guy ropes connected to the braces adjacent the connection thereof with the beams.

In testimony whereof we affix our signatures in the presence of two witnesses.

WILLIAM M. JONES.
JEFF H. JONES.

Witnesses:
H. D. GROVE,
EUGENE WULFF.